United States Patent [19]

Kuit et al.

[11] 4,250,030
[45] Feb. 10, 1981

[54] PROCESS FOR THE REMOVAL OF CYANIDES FROM EFFLUENT

[75] Inventors: Wouterus J. M. Kuit, Trail; Alan R. Babcock, both of Trail, Canada

[73] Assignee: Cominco Ltd., Vancouver, Canada

[21] Appl. No.: 113,993

[22] Filed: Jan. 21, 1980

[30] Foreign Application Priority Data

Oct. 26, 1979 [CA] Canada .................................... 338593

[51] Int. Cl.³ .............................................. B01D 15/00
[52] U.S. Cl. .................................... 210/684; 210/904; 210/716; 210/722
[58] Field of Search ........... 210/38 B, 37 B, DIG. 31, 210/24, 45, 47, 50, DIG. 30, 51, 52, 57, 59; 423/364, 367, 236

[56] References Cited

U.S. PATENT DOCUMENTS

| | | | |
|---|---|---|---|
| 2,194,438 | 3/1940 | Wernlund et al. | 210/DIG. 31 |
| 2,845,330 | 7/1958 | Zabban | 423/43 |
| 3,736,239 | 5/1973 | George et al. | 210/DIG. 31 |

FOREIGN PATENT DOCUMENTS

| | | | |
|---|---|---|---|
| 978677 | 11/1975 | Canada | 210/38 B |
| 2307669 | 8/1974 | Fed. Rep. of Germany | 210/DIG. 31 |
| 49-69544 | 7/1974 | Japan | 210/DIG. 30 |

*Primary Examiner*—Benoit Castel
*Attorney, Agent, or Firm*—Arne I. Fors; Robert F. Delbridge

[57] ABSTRACT

A method is disclosed for removal of free and complex cyanides from water-containing industrial effluents and wastes by treatment with insoluble solid iron sulfides at a pH in the range of about 7.0 to 8.5. The insoluble solid iron sulfides can be chemically prepared prior to treatment or prepared in situ, usually of a particle size smaller than about $5\mu$, or supplied in the form of naturally occurring iron sulfides such as pyrrhotite or pyrite having a particle size smaller than about $300\mu$, preferably smaller than about $150\mu$. The weight ratio of iron sulfide to total cyanide in the effluent is greater than 2:1, preferably greater than about 5:1 for prepared iron sulfides and greater than about 100:1 for mineral sulfides. The presence of a reducing agent such as ferrous ions or sodium sulfite to maintain a non-oxidizing environment during treatment enhances removal of cyanide.

22 Claims, No Drawings

PROCESS FOR THE REMOVAL OF CYANIDES FROM EFFLUENT

BACKGROUND OF THE INVENTION

This invention relates to the removal of cyanide from effluents and wastes and, more particularly, relates to a method for the removal of free and combined dissolved cyanides from aqueous industrial effluents and wastes.

Due to increasingly stringent requirements for the disposal of noxious materials in waste waters and effluents from industrial processes, considerable effort has been expended, especially during the last ten years, to detoxify effluents that contain cyanides. As a result, many methods are reported in the literature that disclose the removal of free and combined cyanides from such effluents. These methods include oxidation of cyanide by treatment with chlorine, hypochlorite or ozone, treatment with an aldehyde, treatment with activated carbon or silica, removal as precipitated metal cyanides, treatment with fly ash or flue gas, and removal by irradiation, chelating, ion exchange or heating. However, in practice, most of the reported methods do not achieve the removal of cyanides and complex cyanides to levels that satisfy the requirements for safe disposal of aqueous effluents, while many methods are economically unattractive for the removal of small concentrations of cyanides from large quantities of effluent. Moreover, most methods are unsuitable to remove cyanides from slurries and solids such as flotation tailings.

We have now discovered that free cyanide as well as combined cyanides can be effectively and economically removed from effluents by treating the effluents with iron sulfides.

In the flotation concentration of mineral values in ores, cyanide ions are often used to depress certain sulfides such as, for example, iron sulfides in the concentration of lead sulfide. The depression of sulfides with cyanide ions is usually carried out at pH values of from 8 to 12.

Several methods have been disclosed that relate to the treatment of effluents with iron sulfides. According to U.S. Pat. No. 3,294,680, there is disclosed a method for reducing and removing chromate from solution by contacting the solution with a mass of hard metal sulfide, such as iron sulfide granules, at a pH of about 7.5.

According to U.S. Pat. No. 3,740,331, there is disclosed a method for the removal of heavy metal pollutant ions in a sulfide precipitation wherein sulfide ion and a heavy metal ion, which form a sulfide having a higher equilibrium sulfide ion concentration than the sulfide of the heavy metal pollutant, are added to the solution. In U.S. Pat. No. 3,901,802 there is disclosed a process for extracting heavy metal ions from solution wherein solution is contacted with an insoluble mixed salt of iron sulfide and barium sulfate containing a surplus of sulfide ions. According to U.S. Pat. No. 4,102,784, heavy metal pollutant ions are precipitated from solution by adding a slurry of large particle size ferrous sulfide precipitate to the solution in the presence of a polyelectrolyte to form a colloid-free metal ion precipitate. The foregoing methods are strictly related to the removal of heavy metal ions.

In a Technical Bulletin issued by the Permutit Co., on the Sulfex (Trade Mark) Heavy Metals Waste Treatment Process, it is stated that the process for removal of heavy metals with freshly precipitated iron sulfides at pH 8-9 is a heavy metal removal system, and that any cyanides must be oxidized in a pretreatment step. According to Japanese Kokai No. 53 101 846, which issued on Sept. 5, 1978, there is disclosed a method for the inhibition of corrosion of waste water treatment apparatus in which ferrous ions are added to waste water that contains hydrogen sulfide, ammonia and cyanide corrosion inhibitor. The water is filtered to remove iron sulfide and then treated in a stripper.

STATEMENT OF INVENTION

We have now discovered that free cyanide ions and complex cyanide ions can be effectively and economically removed from effluents and wastes by treatment with iron sulfides under carefully controlled conditions.

Accordingly, there is provided a method for the removal of dissolved free and complex cyanides from water-containing effluent which comprises controlling the pH of said effluent in a range of about 7.0 to 8.5 and treating said effluent with an effective amount of an insoluble iron sulfide chosen from at least one of ferrous sulfide and ferric sulfide having particle sizes smaller than about 300$\mu$ for a period of time of at least about 5 minutes to remove said dissolved free and complex cyanides to a desired level, said effective amount being sufficient to give a weight ratio of said iron sulfide to total cyanide in said effluent of greater than 2:1.

DESCRIPTION OF PREFERRED EMBODIMENTS

The invention will now be described in detail. Effluents that may be treated according to the method of the invention are aqueous solutions, suspensions and slurries that are encountered in the metallurgical and metal processing industries. Such effluents comprise, for example, tailings and solutions from flotation processes for concentrating metal values in ores and electro-plating waste solutions which contain cyanides as free cyanide ions and/or metal cyanide complex ions of such metals as iron, copper, nickel and zinc. Effluents may be treated as such or may be pretreated for removal of at least a portion of the solids such as by settling or thickening and decantation, or filtration, with or without the use of flocculants or filter aids.

Effluent is treated with solid iron sufides under controlled conditions whereby a major portion of the free and complex cyanides is removed from the effluent. Without being bound by theoretical considerations, the removal is believed to be mostly due to adsorption of free and complex cyanides on the surface of the insoluble solid iron sulfide particles. The treatment is conducted by contacting an effective amount of finely divided solid iron sulfides with effluent for a period of time sufficient to reduce the cyanide content of the effluent. The contacting is performed by using known methods for obtaining intimate contact between effluent and iron sulfides. For example, effluent is agitated with solid iron sulfides, or effluent is agitated with a slurry of solid iron sulfides, or effluent is percolated through a body containing solid iron sulfides. The contacting by agitation with iron sulfide may be performed in a single stage, or may be performed in two or more stages in co-current or counter-current fashion.

Suitable iron sulfides are ferrous sulfide and ferric sulfide which may be used in the form of prepared compounds, i.e. chemically prepared iron sulfides, either as purchased or freshly prepared prior to the treatment of effluent or prepared in situ, or in the form of naturally occurring mineral iron sulfides such as pyrrhotite and pyrite. Freshly prepared iron sulfides are made by conventional methods, while iron sulfides prepared in situ are preferably obtained by adding to the effluent a predetermined amount of ferrous sulfate or ferric sulfate and a stoichiometric amount of sodium sulfide or other suitable soluble sulfide that forms ferrous sulfide or ferric sulfide with the ferrous sulfate or ferric sulfate, respectively. The mineral iron sulfides are preferably used in the form of tailings or concentrates which contain at least one of pyrrhotite and pyrite.

The degree of cyanide removal is a direct function of the mass to surface area ratio of the iron sulfides. The lower the ratio, i.e. the finer the size of the iron sulfides, the more efficient and complete will be the cyanide removal. Prepared iron sulfides have particle sizes that are usually smaller than about $5\mu$ (microns). Mineral iron sulfides in the form of tailings or concentrates are usually also finely divided, i.e. have particle sizes that are smaller than about $300\mu$, usually smaller than $150\mu$. If desired, coarse mineral sulfides may be subjected to a particle size reduction operation. A size reduction to particle sizes smaller than at least about $300\mu$, preferably smaller than about $150\mu$, is advantageous.

The choice of whether to use prepared or mineral iron sulfides depends on the manner in which effluent is contacted with iron sulfides, as well as on economic considerations. Mineral sulfides may be advantageously used where they are readily available. Because mineral iron sulfides have generally larger particle sizes than prepared sulfides, the use of mineral sulfides in the form of tailings and concentrates requires larger amounts and longer contact periods to attain the same degree of cyanide removal than the use of prepared sulfides. The lower efficiency of mineral sulfides may also be due to the presence of aged surface areas and residual flotation agents. The effectiveness of mineral iron sulfides in the process of the invention may be increased by subjecting the sulfides to milling whereby not only particle sizes are reduced but also fresh surface areas are exposed.

Mineral iron sulfides are advantageously used when effluent is treated by percolating effluent through a body of iron sulfides. The body of iron sulfides consists of a column or bed of finely divided solid mineral iron sulfides having particle sizes generally larger than about $44\mu$, preferably in the range of about 44 to $300\mu$, most preferably in the range of about 44 to $150\mu$. Too large a content of mineral sulfide particles smaller than about $44\mu$ causes too rapid a decrease in the effectiveness of the percolation body due to plugging of the interstices in the body and a consequent diminishing of the percolation rate, while particles larger than $300\mu$ have a high mass to surface area ratio which is less effective than a lower ratio. The method of contacting by percolation is suitable when treating aqueous effluents that are substantially free of solids or have a low solids content. It is reiterated that effluents may be treated for removal of at least a portion of contained solids prior to being subjected to percolation.

Prepared iron sulfides are used when cyanide levels must be reduced to very low levels in effluents that contain solids and in cases where mineral sulfides re not available or are uneconomical to use. Ferrous sulfide and ferric sulfide may be used singly or as a mixture. As stated hereinabove, prepared iron sulfides can be readily obtained by purchase or can be prepared prior to treatment of effluent or in situ. Preferably, iron sulfides are prepared in aqueous solution by reacting ferrous sulfate and/or ferric sulfate, or other suitable ferrous and/or ferric salt, with a soluble sulfide causing precipitation of finely divided solid ferrous and/or ferric sulfide. The resulting reaction mixture is subsequently added to the effluent in the form of a slurry or suspension either batchwise in a predetermined amount or in continuous or semi-continuous fashion at a predetermined rate. Alternatively, iron sulfides are prepared in situ by adding predetermined amounts of ferrous and/or ferric sulfate or other suitable ferrous and/or ferric salts and a suitable soluble sulfide causing precipitation of ferrous and/or ferric sulfide. The effluent and added or in situ-prepared iron sulfides are thoroughly agitated to ensure intimate contact between effluent and iron sulfide particles. After a suitable contact time, the mixture may be separated into treated effluent and iron sulfide components. The iron sulfides may be impounded or, if desired, a portion of the iron sulfides may be recycled after separation from treated effluent for treatment of further amounts of effluent.

The amount of prepared or mineral sulfides to be used depends on the physical characteristics of the effluent, the amounts and nature of the cyanides in the effluent, the origin and nature of the iron sulfides and, in the case of mineral sulfides, on the amount of iron sulfides present in the concentrate or tailings employed.

Generally, the amount of iron sulfides must be used or added in an effective amount, i.e., an amount that is at least sufficient to remove dissolved free and complex cyanides from the effluent to the desired level. Preferably, iron sulfides are used in excess. The excess may be expressed as the weight ratio of iron sulfides, i.e. ferrous sulfide and/or ferric sulfide, to the total cyanide content of the effluent, denoted hereinafter as the FeS/CN ratio. For percolation, this ratio will, of course, be very high, such as 100:1, and as high as $10^6:1$, while for agitating iron sulfides with effluent the ratio should be at least about 2:1, i.e. provide a 100% excess of sulfides. When using prepared iron sulfides, the ratio is preferably in the range of about 5:1 to 20:1, while when using mineral sulfides, the ratio is preferably at least 100:1.

The pH during contacting of effluent with iron sulfides is critical and must be carefully controlled. The pH is to be controlled in the range of about 7.0 to 8.5. Below a pH of about 7, hydrogen cyanide is liberated and cyanide complexes are not removed effectively. At a pH above about 8.5, cyanide removal is incomplete due to increased competition of cyanide and complex cyanide ions with hydroxyl ions for adsorption on the iron sulfide surfaces. The value of the pH is preferably maintained in the range of about 7 to 8, and most preferably at a value of about 7.5 which results in optimum removal of free and complex cyanides. We have found that cyanide ions are most strongly adsorbed in the pH range of 7 to 8 and that, for example, cuprocyanide is dissociated by ferrous sulfide and pyrrhotite leaving the cyanide strongly bound to the adsorbent. Copper is removed from solution by precipitation. The pH of the effluent is adjusted to a pH in the range of about 7 to 8, preferably to a value of about 7.5, prior to or during contacting with iron sulfides and the pH is maintained in this range during the contacting step. The adjusting and maintaining of the pH in the preferred range is accomplished by adding either an acid, such as dilute sulfuric acid, or an alkali, such as sodium hydroxide or lime, as required.

Although the adsorption process is temperature dependent, the treatment of effluent is carried out at ambient temperatures using the effluent at the temperature at which it is obtained. The contacting is carried out over a period of time that is sufficient to reduce the cyanide content of the effluent to the desired level. Using prepared iron sulfides which have particle sizes smaller than $5\mu$, a contact time of at least 5 minutes is required to obtain removal of cyanides. When agitating effluent with prepared iron sulfides, the contact time is preferably in the range of about 15 to 180 minutes and, most preferably, in the range of 15 to 60 minutes. For mineral iron sulfides which have particle sizes in the range of 44 to $300\mu$, the contact time is preferably at least 30 minutes and most preferably in the range of about 30 minutes to 10 hours. When percolating effluent through a body of particulate iron sulfides, the contact time is preferably at least 30 minutes and is most preferably in the range of about 1 to 24 hours.

We have found that the presence of a reducing agent will further depress the amount of cyanide in solution. Suitable reducing agents, eg. ferrous ions and sodium sulfite, are added in a quantity to maintain a non-oxidizing environment. We have also found that in the case of high concentrations of the ferrocyanide complex in the effluent, the presence of free, i.e. excess, ferrous ions will cause precipitation of prussian blue-type compounds. Thus, the presence of added free ferrous ions further depresses the total cyanide content of the effluent. Free ferrous ions are added in the form of a suitable, soluble ferrous salt.

The invention will now be illustrated by means of the following non-limitative examples.

EXAMPLE 1

Effluent containing 38 mg/L total cyanide (T/CN), of which 14.4 mg/L was free CN and 23.6 mg/L was CN as cuprocyanide ($Cu(CN)_3^{2-}$), and having a pH of 9.5, was percolated through a bed of mixed pyrrhotite-pyrite concentrate. The concentrate was screened to particle sizes in the range of 44 to $74\mu$. The bed volume was 600 mL and the retention time of the effluent, which was pumped upwardly through the bed, was 30 minutes. 500 mL percolated effluent was collected which analyzed 0.08 mg/L T/CN and <0.01 mg/L as $Cu(CN)_3^{2-}$ and had a pH of 7.0.

EXAMPLE 2

The test of Example 1 was repeated but the concentrate was screened to remove particles smaller than $74\mu$. The percolated effluent had a pH of 7.5 and contained 0.68 mg/L T/CN and 0.05 mg/L CN as $Cu(CN)_3^{2-}$.

The tests of Examples 1 and 2 show that free and complex cyanides can be effectively removed from effluent by percolating through a bed of finely divided iron sulfides and that smaller particle sizes are more effective in the removal.

EXAMPLE 3

This example illustrates the removal of free and complex cyanides from tailings from a metallurgical operation by percolating tailings solution through a bed of pyrrhotite-pyrite concentrate. The tailings were settled and the decanted solution was filtered through a bed of diatomaceous earth to remove colloidal matter. The clarified solution contained 21 mg/L total cyanide (CN), 0.9 mg/L free CN, 10.3 mg/L CN as cuprocyanide ($Cu(CN)_3^{2-}$) and 9.8 mg/L CN as ferrocyanide ($Fe(CN)_6^{4-}$), and had a pH of 9.5. The percolation bed was prepared by wet screening the concentrate to remove particles smaller than $44\mu$ and the remaining slurry was poured into a 4.6 cm diameter percolation column. After settling, the excess water was decanted. The final bed depth was 36 cm giving a bed volume of 600 mL. In a first test clarified solution was percolated at its natural pH of 9.5 and in a second test the solution was adjusted to pH 7.5 before being percolated.

The clarified solution was pumped upwardly through the bed at a rate of 3.75 mL/min. The treated effluent was collected in 600 mL portions over a period of 45 hours and analyzed. The retention time was one hour. The test results are given in Table I.

TABLE I

| Test No. | Cumulative volume of effluent in mL | pH | CN in treated effluent in mg/L Total | free | as $Cu(CN)_3^{2-}$ | as $Fe(CN)_6^{4-}$ |
|---|---|---|---|---|---|---|
| 1 | 600 | 9.5 | 0.24 | — | 0.01 | 0.45 |
|   | 1200 | 9.5 | 2.0 | 0.4 | 0.06 | 1.54 |
|   | 1800 | 9.5 | 5.1 | 1.1 | 0.04 | 4.0 |
|   | 2400 | 9.5 | 6.3 | — | 0.01 | 6.5 |
|   | 2700 | 9.5 | 8.5 | 0.4 | 0.01 | 8.1 |
| 2 | 300 | 7.5 | 0.60 | 0.18 | 0.03 | 0.39 |
|   | 900 | 7.5 | 0.75 | 0.21 | 0.01 | 0.53 |
|   | 1500 | 7.5 | 1.50 | 1.11 | 0.03 | 0.36 |
|   | 2100 | 7.5 | 0.25 | — | 0.05 | 0.42 |
|   | 2700 | 7.5 | 2.00 | 1.24 | 0.03 | 0.73 |

The results show free and complex cyanides can be effectively removed by percolation of effluent through a body of finely divided iron sulfides and that the removal is more effective at pH 7.5.

EXAMPLE 4

One liter of the effluent as used in Examples 1 and 2 was agitated for a period of 24 hours with 800 g of a mixed pyrite-pyrrhotite concentrate. The treated effluent had a pH of 7.5 and contained 0.08 mg/L total CN and <0.01 mg/L CN as $Cu(CN)_3^{2-}$. The FeS/CN weight ratio was 20000:1.

EXAMPLE 5

This example illustrates the removal of cyanide from tailings from a metallurgical operation by mixing tailings solution with varying amounts of an iron sulfide concentrate. The tailings were settled and one liter portions of the decanted solution containing 55 mg/L T/CN were mixed with concentrate for a period of 10 hours, while maintaining the pH at a value of 7.5. Samples were taken after 2, 4, 6 and 10 hours. The samples were filtered and analyzed for total cyanide (T/CN) content. The results are given in Table II.

TABLE II

| Amount of Sulfides Concentrate in g | Weight Ratio iron sulfides to cyanides | T/CN in mg/L 0 hr | 2 hr | 4 hr | 6 hr | 10 hr |
|---|---|---|---|---|---|---|
| 250 | 4000:1 | 55 | 11 | 8 | 20 | — |
| 667 | 10000:1 | 55 | 5.2 | 6.4 | 3.0 | 5.0 |
| 1500 | 23000:1 | 55 | 2.6 | 1.2 | 0.2 | 0.1 |
| 4000 | 62000:1 | 55 | <0.2 | 1.5 | 1.5 | — |

The results of the tests in Examples 4 and 5 show that cyanides can be effectively removed from effluent by agitating effluent with finely divided mineral iron sulfides at a pH of 7.5 using retention times of 2 to 19 hours at ratios of iron sulfides to total cyanides (FeS/CN) of 4000:1 to 62000:1.

EXAMPLE 6

400 mL portions of an effluent containing 100 mg/L T/CN, 16.7 mg/L free CN, 33.2 mg/L CN as $Cu(CN)_3{}^{2-}$ and 50 mg/L CN as $Fe(N)_6{}^{4-}$, and having a pH of 9.5, were adjusted to different pH values. The portions were each mixed with an amount of freshly prepared solid ferrous sulfide to give an iron sulfide to cyanide (FeS/CN) ratio of 8.33:1. The mixtures were each agitated for 15 minutes, a sample taken, agitated for a further 45 minutes, and a second sample taken. The samples were filtered through a 0.45μ filter and analyzed for cyanides. The results are given in Table III.

TABLE III

| Retention time in min. | Adjusted pH of Effluent | CN in Treated Effluent in mg/L | | | |
|---|---|---|---|---|---|
| | | Total | Free | as $Cu(CN)_3{}^{2-}$ | as $Fe(CN)_6{}^{4-}$ |
| 15 | 7.0 | 5.6 | 4.1 | 0.05 | 1.5 |
| 60 | 7.0 | 4.3 | 2.3 | <0.02 | 2.0 |
| 15 | 8.0 | 4.7 | 1.1 | 0.06 | 3.6 |
| 60 | 8.0 | 3.9 | — | <0.02 | 4.3 |
| 15 | 8.5 | 15 | 0 | <0.02 | 15 |
| 60 | 8.5 | 9 | 0 | <0.02 | 9 |
| 15 | 9.0 | 68 | 0 | 0.07 | 68 |
| 60 | 9.0 | 53 | 0 | <0.02 | 53 |

It can be seen from the data given in Table III that a major portion of the cyanides can be removed from effluent by mixing with prepared ferrous sulfide at a pH in the range of 7.0 to 8.5 and that best results are obtained at a pH of from 7.0 to 8.0. A retention time of 60 minutes gives better results than one of 15 minutes. The data also show that copper and cuprocyanide are substantially removed from the effluent. The high figures for ferrocyanide at pH 9.0 indicate that ferrocyanide is formed and incompletely adsorbed on the sulfide.

EXAMPLE 7

This example illustrates that an excess of ferrous sulfide improves the removal of cyanide and that cyanide removal increases with increasing FeS/CN ratios. Portions of effluent containing 100 mg/L free CN at pH 7.5 were contacted with amounts of prepared ferrous sulfide to give predetermined FeS/CN weight ratios. The mixtures were agitated for 60 minutes, filtered and the treated effluent analyzed for total CN. The results are given in Table IV.

TABLE IV

| Weight Ratio FeS/CN | Total CN in Treated Effluent in mg/L |
|---|---|
| 1.0 | 38 |
| 3.0 | 23 |
| 4.0 | 12 |
| 5.0 | 3.5 |
| 6.3 | 0.48 |

EXAMPLE 8

Effluent containing 96 mg/L free CN and having a pH of 10.0 was adjusted to pH 7.5 using dilute sulfuric acid. Ferrous sulfide was prepared in the effluent by adding a solution of sodium sulfide and a solution containing ferrous sulfate in a stoichiometric amount to form ferrous sulfide in an amount to give a FeS/CN ratio in the effluent of 6.28:1. The mixture was agitated and samples taken after 15, 30, 60 and 180 minutes. The samples were filtered using a 0.45μ filter and the filtered samples were analyzed. The results are given in Table V.

TABLE V

| Retention Time in min. | Treated Effluent Total CN in mg/L |
|---|---|
| 15 | 1.9 |
| 30 | 1.0 |
| 60 | 0.48 |
| 180 | 0.84 |

The results show that free cyanide can be effectively removed by agitating effluent with ferrous sulfide prepared in situ for periods of time in the range of 15 to 180 minutes with best results obtained at 60 minutes.

EXAMPLE 9

Effluent containing 96 mg/L T/CN, 55 mg/L free CN and 41 mg/L CN as $Cu(CN)_3{}^=$ and having a pH of 9.5 was adjusted to pH 7.5 by adding the necessary amount of dilute sulfuric acid. Previously prepared ferrous sulfide having particle sizes of less than 5μ was added to the effluent in an amount to give a ratio of ferrous sulfide to total cyanide of 6.4:1. The mixture was agitated and samples taken after 15, 30, 60 and 180 minutes. The samples were filtered using a 0.45μ filter and the filtered samples were analyzed. The results are given in Table VI.

TABLE VI

| Retention Time in min. | CN in Treated Effluent in mg/L | |
|---|---|---|
| | Total | as $Cu(CN)_3{}^=$ |
| 15 | 4.8 | 0.09 |
| 30 | 4.0 | <0.01 |
| 60 | 1.2 | <0.01 |
| 180 | 1.4 | <0.01 |

The results show that free cyanide and cuprocyanide can be effectively removed by agitating effluent with prepared ferrous sulfide using retention times of from 15 to 180 minutes with best results obtained at 60 minutes retention.

EXAMPLE 10

Effluent containing 94 mg/L CN as $Fe(CN)_6{}^{4-}$ and having a pH of 9.5 was adjusted to pH 7.5. Prepared ferrous sulfide was added to the effluent in an amount sufficient to give a FeS/CN ratio of 6.4:1. The mixture was agitated and samples taken after 15, 30, 60 and 180 minutes. The samples were filtered through a 0.45μ filter and analyzed for T/CN. The results are given in Table VII.

TABLE VII

| Retention Time in min. | Treated Effluent T/CN in mg/L* |
|---|---|
| 15 | 0.15 |
| 30 | 0.10 |
| 60 | 0.09 |
| 180 | 5.5 |

*All cyanide was adsorbed as the ferrocyanide complex.

The results shown in Table VII indicate that ferrocyanide can be substantially removed from effluent by treating the effluent with prepared ferrous sulfide at pH 7.5 and with agitation for a retention period of 15 to 60 minutes. At retention times appreciably longer than 60 minutes, the cyanide content of the treated effluent increases because of oxidation.

EXAMPLE 11

Two portions of effluent containing 35 mg/L total CN, 15.4 mg/L free CN, 4.1 mg/L CN as $Cu(CN)_3{}^{2-}$ and 15.5 mg/L CN as $FE(CN)_6{}^{4-}$ were adjusted to pH 7.5 and treated with prepared ferrous sulfide to yield varying FeS/Cn ratios and varying amounts of free ferrous ions were added. A third portion of effluent was similarly treated but no excess ferrous ions was present. The results are given in Table VIII.

TABLE VIII

| Retention Time in min. | Ratio FeS/CN | Excess $Fe^{2+}$ in mg/L | CN in Treated Effluent in mg/L | | | |
|---|---|---|---|---|---|---|
| | | | Total | Free | $Cu(CN)_3{}^{2-}$ | as $Fe(CN)_6{}^{4-}$ |
| 15 | 2 | 22.3 | 12 | 1.3 | 0.17 | 10.5 |
| 30 | 2 | 22.3 | 11 | 1.0 | 0.80 | 9.2 |
| 15 | 13.35 | 164.0 | 3.5 | 3.4 | 0.02 | <0.1 |
| 30 | 13.35 | 164.0 | 2.2 | 2.1 | 0.02 | <0.1 |
| 15 | 13.35 | 0 | 4.6 | 4.3 | 0.03 | 0.3 |
| 30 | 13.35 | 0 | 4.5 | 4.0 | 0.02 | 0.5 |

The data in Table VIII indicate that better removal of cyanides is obtained at high FeS/CN ratios and that the presence of free ferrous ions effectively reduces the cyanide content of the effluent.

EXAMPLE 12

Portions of a high cyanide containing effluent containing 560 mg/L total CN, 162 mg/L free CN, 51 mg/L CN as $Cu(CN)_3{}^{2-}$ and 347 mg/L CN as $Fe(CN)_6{}^{4-}$ were treated with prepared ferrous sulfide with and without the addition of excess ferrous ions. The FeS/CN ratio, effluent pH and retention times while agitating were varied. The results are given in Table IX.

TABLE IX

| Retention Time in min. | FeS/CN ratio | excess $Fe^{2+}$ in g/l | pH | CN in Treated Effluent in mg/L | | |
|---|---|---|---|---|---|---|
| | | | | Total | as $Cu(CN)_3{}^{2-}$ | as $Fe(CN)_6{}^{4-}$ |
| 60 | 2 | 0 | 7.5 | 156 | <0.01 | 0.48 |
| 30 | 8.9 | 0 | 7.5 | 16 | 0.02 | 0.28 |
| 30 | 8.9 | 0 | 8.5 | 38 | 0.02 | 1.3 |
| 20 | 13.35 | 0 | 7.5 | 29 | 0.05 | 0.22 |
| 30 | 13.35 | 0 | 8.5 | 24 | 0.05 | 0.64 |
| 30 | 2 | 0.47 | 7.5 | 33 | <0.01 | 0.22 |
| 30 | 5 | 1.18 | 7.5 | 31 | <0.01 | 0.34 |
| 60 | 5 | 1.18 | 7.5 | 13 | <0.01 | |

The tabulated results show that best results are obtained with retention times of 20 to 60 minutes at pH 7.5 using FeS/CN ratios of 5:1 to 15:1, that cuprocyanide and ferrocyanide are effectively removed from the effluent and that cyanide can be more effectively removed when free ferrous ions are present.

EXAMPLE 13

In a continuous operation for the treatment of cyanide containing effluent from a metallurgical operation, 91 L/min effluent, containing varying amounts of cyanides, was fed to an agitated reaction vessel. A slurry of ferrous sulfide was prepared in a separate vessel by mixing stoichiometric amounts of ferrous sulfate heptahydrate and sodium sulfide, both in aqueous solution. Slurry containing 54 g/L ferrous sulfide was continuously added to the reaction vessel in an amount sufficient to maintain the FeS/CN ratio as predetermined values. The pH of the mixture in the reaction vessel was maintained at 7.5 by adding an 18.6% solution of $H_2SO_4$ as required. During periods of the operation, excess free ferrous ions was added to the reaction vessel. The retention time of the effluent in the reaction vessel was 90 minutes. The discharging effluent was periodically sampled and the samples were filtered and analyzed. Operating parameters and analysis results are shown in Table X.

TABLE X

| FeS in mg/L | FeS/CN weight ratio | Excess $Fe^{++}$ g/L | CN in effluent in mg/L | | | CN in treated effluent in mg/L | | |
|---|---|---|---|---|---|---|---|---|
| | | | free | $Cu(CN)_3{}^{2-}$ | $Fe(CN)_6{}^{4-}$ | free | $Cu(CN)_3{}^{2-}$ | $Fe(CN)_6{}^{4-}$ |
| 0.94 | 1.20 | Nil | 618.2 | 64.9 | 99.5 | 140.3 | 38.5 | 241.2 |
| 0.94 | 1.28 | 0.20 | 492.7 | 64.1 | 175.8 | 29.4 | 11.1 | 104.6 |
| 1.26 | 2.10 | Nil | 110.5 | 71.2 | 418.3 | 20.4 | 9.3 | 180.3 |
| 1.28 | 2.15 | 0.23 | 75.8 | 65.1 | 454.1 | 8.8 | 0.1 | 60.4 |
| 1.95 | 3.20 | Nil | 135.5 | 61.4 | 413.1 | 19.5 | 2.8 | 146.7 |
| 1.90 | 3.07 | 0.39 | 201.4 | 68.6 | 350.0 | Nil | 0.04 | 10.0 |

The data presented in Table X clearly demonstrate that in excess of 98% removal of T/CN was attained with an FeS/Cn weight ratio of about 3:1 and an excess of about 0.4 g/L ferrous ions.

EXAMPLE 14

One L effluent containing 100 mg/L T/CN and having a pH of 7.5 was agitated with an amount of prepared ferric sulfide sufficient to give a FeS/CN weight ratio of 10:1. The mixture was sampled after 15, 30 and 180 minutes retention and the samples, filtered and analyzed, were found to contain 23.0, 10.5 and 1.6 mg/L T/CN, respectively.

This example illustrates that cyanide can be effectively removed from effluent by treating with ferric sulfide.

EXAMPLE 15

One L portions of effluent containing 100 mg/L T/CN were treated with either 1 g prepared ferrous sulfide or ferric sulfide with and without a reducing agent. 120 mg $SO_3$ as sodium sulfite was used as reducing agent. The mixtures were periodically sampled and the samples were filtered and analyzed. The results are shown in Table XI.

TABLE XI

| | T/CN in mg/L | | | |
|---|---|---|---|---|
| | Ferrous Sulfide | | Ferric Sulfide | |
| Retention Time in min. | without Reducing Agent | with Reducing Agent | without Reducing Agent | with Reducing Agent |
| 15 | 0.76 | 0.20 | 23.0 | 21.0 |
| 30 | 0.32 | 0.20 | 10.5 | 9.3 |

TABLE XI-continued

| | T/CN in mg/L | | | |
|---|---|---|---|---|
| | Ferrous Sulfide | | Ferric Sulfide | |
| Retention Time in min. | without Reducing Agent | with Reducing Agent | without Reducing Agent | with Reducing Agent |
| 60 | 0.30 | <0.04 | — | 3.4 |
| 180 | 0.23 | 0.16 | 1.6 | 1.8 |

As can be seen from the results presented in Table XI, the presence of a sodium sulfite as a reducing agent further improves the removal of cyanide from effluent when the effluent is treated with ferrous sulfide. Little or no improvement was obtained in this example when effluent was treated with ferric sulfide.

It will be understood, of course, that modifications can be made in the embodiment of the invention described and illustrated herein without departing from the scope and purview of the invention as defined by the appended claims.

What we claim as new and desire to protect by Letters Patent of the United States is:

1. A method for the removal of dissolved free and complex cyanides from water-containing effluent which comprises controlling the pH of said effluent in a range of about 7.0 to 8.5 and contacting said effluent with an effective amount of an insoluble solid iron sulfide chosen from at least one of ferrous sulfide and ferric sulfide having particle sizes smaller than about 300μ for a period of time of at least about 5 minutes to remove said dissolved free and complex cyanides to a desired level, said effective amount being sufficient to give a weight ratio of said iron sulfide to total cyanide in said effluent of greater than about 2:1.

2. A method as claimed in claim 1, wherein the effluent contains cyanides of at least one of cyanide ions, complex cyanide ions of iron, copper, nickel and zinc, or mixtures thereof.

3. A method as claimed in claim 1, wherein said iron sulfide is prepared prior to treatment of effluent or in situ during treatment of effluent and has a particle size smaller than about 5μ.

4. A method as claimed in claim 3, wherein said weight ratio is in the range of about 5:1 to about 20:1.

5. A method as claimed in claim 4, wherein the effluent is contacted with the iron sulfide in a single stage, or in two or more co-current or counter-current stages.

6. A method as claimed in claim 3, 4 or 5, wherein the effluent and iron sulfide are agitated to ensure intimate contact between said effluent and iron sulfide particles and said pH is controlled in a range of about 7 to 8.

7. A method as claimed in claim 6, wherein iron sulfide is separated from effluent after contacting with said iron sulfide and at least a portion of the separated iron sulfide is returned to said treatment.

8. A method as claimed in claim 3, 4 or 5, wherein said contacting is carried out for a period of time in the range of about 15 to about 180 minutes.

9. A method as claimed in claim 3, 4 or 5, wherein said contacting is carried out for a time in the range of about 15 to 60 minutes.

10. A method as claimed in claim 1, wherein the effluent is contacted with a particulate material chosen from concentrate and tailings, said material containing at least one mineral iron sulfide chosen from pyrrhotite and pyrite.

11. A method as claimed in claim 10, wherein said particulate material has particle size smaller than 150μ.

12. A method as claimed in claim 11, wherein said weight ratio is at least about 100:1.

13. A method as claimed in claim 1, wherein said contacting is carried out for a time in the range of about 30 minutes to 10 hours.

14. A method as claimed in claim 11, 12 or 13, wherein the effluent and iron sulfide are agitated to ensure intimate contact between said effluent and iron sulfide particles and said pH is controlled in a range of about 7 to 8.

15. A method as claimed in claim 1, wherein effluent is percolated at a pH in the range of about 7 to 8 through a particulate body containing mineral iron sulfide.

16. A method as claimed in claim 15, wherein said effluent is percolated through a particulate body of material chosen from concentrate and tailings containing at least one iron sulfide chosen from pyrrhotite and pyrite, and wherein the contact time of effluent with said body is at least about 30 minutes.

17. A method as claimed in claim 16, wherein said contact time is in the range of about one to 24 hours.

18. A method as claimed in claim 17, wherein said particulate body has particle sizes in the range of about 44 to 300μ.

19. A method as claimed in claim 15, 16 or 17, wherein said particulate body has particle sizes in the range of about 44 to 150μ.

20. A method as claimed in claim 15, 16 or 17, wherein said weight ratio is at least about 100:1.

21. A method as claimed in claim 1 or 2, wherein the effluent contains ferro-cyanide and wherein the effluent is treated with an excess of free ferrous ions.

22. A method as claimed in claim 1 or 2, wherein the iron sulfide is ferrous sulfide and the effluent is treated in the presence of sodium sulfite.

* * * * *